United States Patent [19]

Takahashi

[11] Patent Number: 5,179,452

[45] Date of Patent: Jan. 12, 1993

[54] METHOD FOR PRODUCING COPY PROTECTED RECORDED VIDEOTAPE HAVING UNCOPYABLE VERTICAL SYNCHRONIZING SIGNAL PARTITION

[75] Inventor: Yasunori Takahashi, Tokyo, Japan

[73] Assignee: Scitec Corporation, Tokyo, Japan

[21] Appl. No.: 225,741

[22] Filed: Jul. 29, 1988

[30] Foreign Application Priority Data

Jul. 29, 1987 [JP] Japan .................................. 62-187683
May 28, 1988 [JP] Japan .................................. 63-129479

[51] Int. Cl.$^5$ .......................................... H04N 5/782
[52] U.S. Cl. .................................. 358/335; 358/319; 360/15; 360/37.1; 360/60; 380/5; 380/15
[58] Field of Search ............... 360/60, 15, 37.1, 33.1, 360/6; 380/5, 10, 15; 358/335, 148, 319, 150, 176; 369/84

[56] References Cited

U.S. PATENT DOCUMENTS

| | | | |
|---|---|---|---|
| 3,801,732 | 4/1974 | Reeves | 380/15 |
| 3,963,865 | 6/1976 | Songer | 380/15 |
| 4,100,575 | 7/1978 | Morio et al. | 380/5 |
| 4,213,149 | 7/1980 | Janko | 380/5 |
| 4,631,603 | 12/1986 | Ryan | 380/5 |
| 4,839,922 | 6/1989 | Imasaki et al. | 380/15 |

FOREIGN PATENT DOCUMENTS

| | | |
|---|---|---|
| 0301504 | 2/1989 | European Pat. Off. . |
| 52-130314 | 11/1977 | Japan . |
| 54-108612 | 8/1979 | Japan . |
| 2055501 | 3/1981 | United Kingdom . |

OTHER PUBLICATIONS

Pamphlet of Matsushita model S-VHS AG-3750 MacLord and Matsushita model S-VHS AG-3700 MacLord, Jan., 1988.
Pamphlet of Victor Co. model S-VHS BR-S3600 (Sales Brochure-Mar., 1988).
Liff, "Color and Black & White Television Theory and Servicing" ISBN 0-13-151192-0 01, 1985.

Primary Examiner—Wayne R. Young
Attorney, Agent, or Firm—Cushman, Darby & Cushman

[57] ABSTRACT

A copy protection arrangement for pre-recorded videotape cassettes. The invention includes both a method of protecting and a protected videotape cassette. Copy protection is provided by recording on at least a portion of the original videotape a composite synchronizing signal including a vertical synchronizing pulse having a pulse width in the range of 1-20 micro-seconds and a pulse height discernible by a vertical synchronizing signal separating circuit of the television receiver. All other vertical synchronizing pulse in the vertical synchronizing signal partition, all the equalizing pulses in a equalizing signal partition following the vertical synchronizing signal partition and at least a part of the horizontal synchronizing pulses in a horizontal synchronizing signal partition following the equalizing signal partition in the composite synchronizing signal having respective pulse height less than a predetermined pedestal level of the synchronizing signals.

4 Claims, 9 Drawing Sheets

METHOD FOR PRODUCING COPY PROTECTED RECORDED VIDEOTAPE HAVING UNCOPYABLE VERTICAL SYNCHRONIZING SIGNAL PARTITION

BACKGROUND OF THE INVENTION

1. Field of the Invention

The present invention is directed to a copy protection arrangement for video cassette recording and playback. The invention includes both a method of protecting and a protected video casette tape.

2. Description of the Prior Art

Pre-recorded video cassette tapes are now in common use and are becoming increasingly popular with the number of videotape recorders (VTRs) in use. Using two VTRs it is possible to copy a pre-recorded videotape, for example, a commercially produced movie, onto a blank videotape.

Although it is permissible to record and copy "over the air" broadcasted television signals for personal use, it is forbidden by copyright law to copy pre-recorded cassette tapes bearing a copyright notice. However, it is difficult to detect illegal copying done in a private home and on a small scale. Therefore, many pre-recorded cassette manufacturers are hesitant to record certain high value audio-visual works onto video cassettes and then place those cassettes into the public marketplace.

Figure 8:
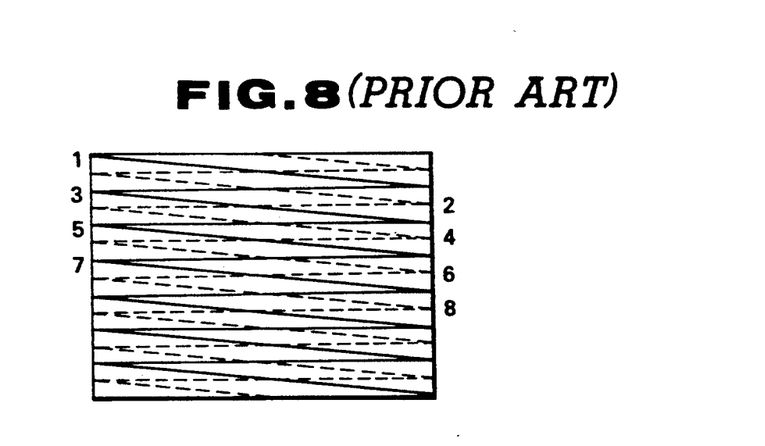
FIG. 8 (PRIOR ART) is illustrative of interlace scanning in a TV frame.

A standard picture frame of a TV receiver adapted for use in the United States or Japan consists of 525 horizontal scan lines which are interlaced every other line to minimize screen flickering. That is, after scanning the odd number lines, e.g. 1, 3, 5, . . . , as shown in FIG. 8 (PRIOR ART), the even numbered lines, e.g. 2, 4, 6, . . . , are scanned as shown by the dotted lines. The method of interlacing a vertical field twice creates a single frame. Scanning by odd number or even number lines only is called "field scanning" and the combination of both is called "frame scanning".

The number of scanning lines varies from country to country, e.g. it is 625 in most countries of Europe, 425 in the United Kingdom and 819 in France. However, all of the major television systems use interlaced scanning. Pictures are transmitted at the rate of 30 frames per second in the United States and Japan and at the rate of 25 frames per second in Europe.

A TV transmission signal includes not only an image signal, but also a blanking signal and a composite synchronizing signal among others. The composite synchronizing signal is simply called a "synchronizing signal". It includes horizontal synchronizing pulses, vertical synchronizing pulses and equalizing pulses. The synchronizing pulses are used for controlling the deflection of the scanning beam used to create passive imagery. That is, the horizontal synchronizing pulse is used for adjusting each horizontal scanning line so that it starts at the left side of the face plate of a Cathode Ray Tube (CRT) and the vertical synchronizing pulse is used for adjusting each field so that it starts at the upper left part of the face plate of the CRT.

Figure 9A:
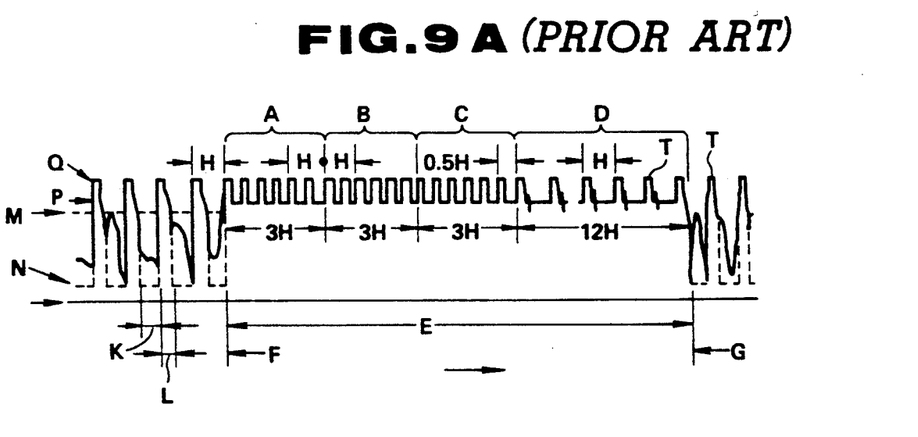
FIGS. 9A (PRIOR ART) and 9B (PRIOR ART) show a part of a signal waveform of TV broadcasting with FIG. 9A (PRIOR ART) showing the waveform of a synchronizing signal in the first field of interlace scanning and FIG. 9B (PRIOR ART) shows the waveform of a synchronizing signal in the following field.

FIG. 9A (PRIOR ART) shows the waveform of the synchronizing signals in a first field of interlaced scanning fields. The vertical blanking interval E lies between the end of one field image F and the beginning of the following field image G. In the vertical blanking interval E, there is a composite synchronizing signal including a first equalizing signal partition A having a width of 3H (1H corresponds to 63.5 microseconds), a vertical synchronizing signal partition B of 3H, a second equalizing signal partition C of 3H and a horizontal synchronizing signal partition D of 12H, A, B, C and D following one another.

In FIG. 9A (PRIOR ART), reference letter K indicates the image signal, reference letter L indicates the horizontal blanking interval, reference letter T indicates the horizontal synchronizing pulse, reference letter M indicates the black level, reference letter N indicates the white level, reference letter P indicates the pedestal level, which is the base signal level of the synchronizing signals, and reference letter Q indicates the maximum carrier wave voltage level.

Figure 9B:
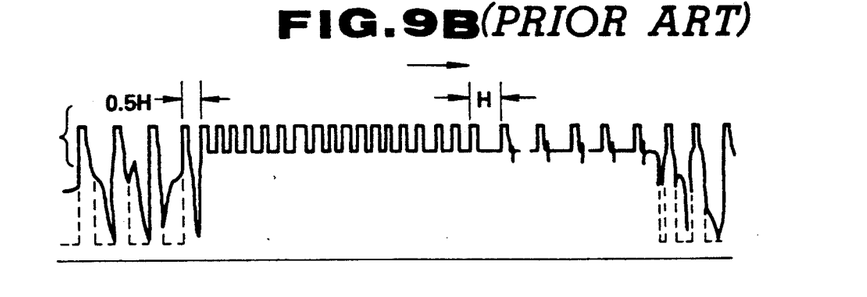

FIG. 9B (PRIOR ART) shows the waveform of the synchronizing signal in the next field of interlaced scanning and is the same as FIG. 9A (PRIOR ART) except for a time lag of 0.5H with respect to FIG. 9A (PRIOR ART).

A VTR may be used to: provide the signal from a pre-recorded video cassette to a TV receiver; or to record onto a blank videotape the signal from a broadcasted TV signal, from a pre-recorded video cassette or from a magnetically encoded master magnetic tape.

Figure 10:
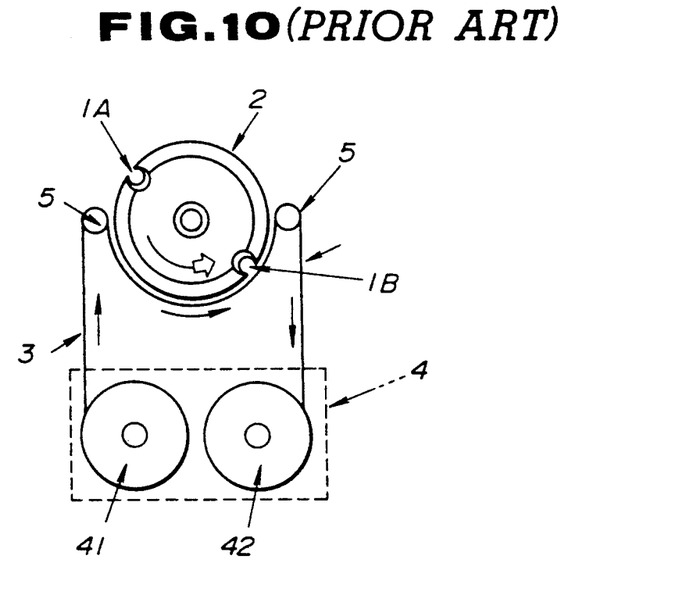
FIG. 10 (PRIOR ART) is an illustration of the relative positions of tape and head in a helical scanning rotary two head type VTR.
Figure 11:
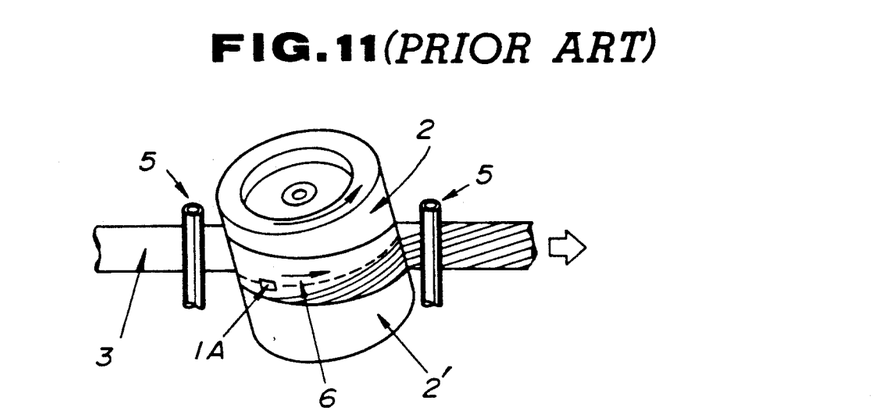
FIG. 11 (PRIOR ART) is a perspective view in the vicinity of the VTR head.

A popular type VTR is the helical scanning rotary two-head type shown in FIG. 10 (PRIOR ART). FIG. 11 (PRIOR ART) is a perspective view of the rotary drum 2 having video-heads 1A and 1B, shown in FIG. 10 (PRIOR ART), placed oblique to the tape 3. The upper portion of rotary drum 2 rotates in a direction indicated by arrow 6 and the lower portion 2' of the rotary drum 2 is stationary. Tape 3 is wound to more than half of the circumference of the drum while the drum is rotated at 30 revolutions per minute (rpm) in the direction of the tape flow. The two video heads 1A and 1B alternately run obliquely on the surface of the tape. A video cassette 4 includes a supply reel 41 and a take-up 42. Tape guides 5 are positioned on each side of the rotary drum 2.

Figure 12:
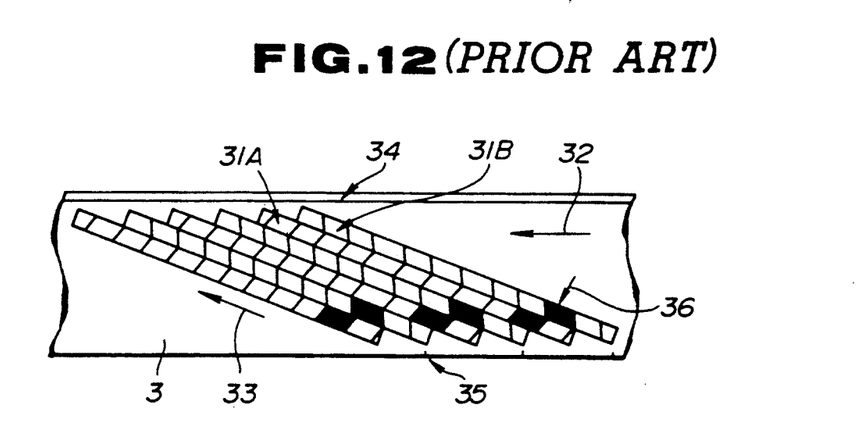
FIG. 12 (PRIOR ART) is an illustration of the video track recorded on the videotape recorded by the prior art.

When recording a TV signal, as shown in FIG. 12 (PRIOR ART), obliquely running video-tracks 31A and 31B are formed on the surface of tape 3. Each track corresponds to one field. Track 31A is recorded by head 1A shown in FIG. 10 (PRIOR ART) and track 31B is recorded by head 1B shown in FIG. 10 (PRIOR ART). The signal waveform that occurs at the beginning of an interlaced scanning as shown in FIG. 9A (PRIOR ART) and the signal waveform in the field of interlaced scanning, as shown in FIG. 9B (PRIOR ART) are recorded alternately. In FIG. 12 (PRIOR ART), reference numeral 32 indicates the running direction of the tape, reference numeral 33 indicates the running direction of the video head, reference numeral 34 indicates the sonic track, and reference numeral 35 refers to the control track. The vertical synchronizing signal is recorded on the position of the tape indicated by reference numeral 36.

Figure 14:
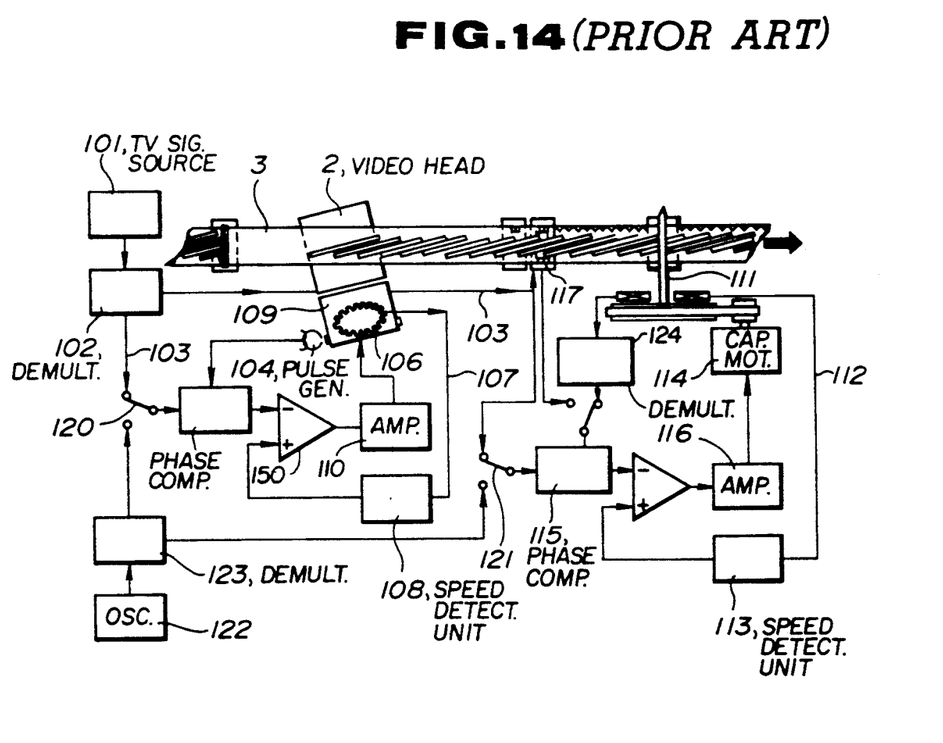
FIG. 14 (PRIOR ART) is a circuit block diagram outlining a typical servo circuit used by a helical scanning rotary two head type videotape recorder.

In a videotape recorder, the rotation of the video head and the running of the tape are driven by motors. Unevenness of the rotation of the video head causes a wavering or disorder of the resulting video image. Irregular rotation of the capstan which moves the tape past the head(s) causes picture tremble or slippage of the locus of the play-back video head from the recording track which degrades picture quality. It is necessary to have a servo system to prevent such signal irregularity. The servo system controls the rotation speed and phase of the drive motors by a feedback loop which includes the motors. A typical servo system is shown in FIG. 14 (PRIOR ART).

While the TV signal is recorded, any lead or lag of the rotation phase of the video head 2 is detected by phase comparing, by means of a phase comparator 105, pulses from a pulse generator 104 attached to the rotating video head and a 30 Hz. control pulse 103 generated at a one-half frequency demultiplier 102 (a one-half frequency demultiplier picks up every other pulse). The vertical synchronizing pulse of TV signal 101 is coupled to demultiplier 102. The resulting output control pulse 103 is coupled to one throw of a switch 120. The other throw of switch 120 is coupled to the output of a frequency demultiplier 123, which is driven by a quartz oscillator 122. The pole of switch 120 is coupled to the input of phase comparator 105. The output of pulse generator 104 is also coupled to an input of phase comparator 105. The output of phase comparator 105 is coupled to the inverting input of an amplifier 110, the non-inverting input of which receives an output of a unit 108. The speed of the drum-motor 109 is corrected for head lead or lag by detecting and controlling its speed via unit 108 by utilizing the frequency of a signal 107 from a frequency generator 106 connected to the axis of the rotary video head. A driving amplifier 110 controls the drum motor 2.

The running speed of the tape 3 is monitored by a unit 113 by analyzing the frequency of a signal 112 generated at a frequency generator attached to the axis 111 of the capstan. Any deviation of the running speed of the tape 3 is detected by phase comparator 115, coupled so as to receive signal 112 control pulse 103 and a signal from a frequency demultiplier 124. Any deviation in speed is corrected by controlling the rotating speed of the capstan motor 114. A driving amplifier 116 controls capstan motor 114.

Control pulse 103 is recorded on a control track located at the edge of tape 3 through the control head 117. The control pulse is recorded on control track 35 at the edge of tape 3 as shown in FIG. 12.

A playback servo to reproduce the recorded TV signal is applied by a capstan servo technique method to make up for differences in tracking. While reproducing the recorded TV signal from a VTR cassette, a capstan servo technique method is applied as a playback servo to make up for differences in tracking.

This is a method of controlling the capstan drive which comprises the switching of the switches 120 and 121 to synchronize the phase of the control pulse 103 with the standard signal generated at a frequency demultiplier 123 by converting a constant frequency pulse generated at a quartz oscillator 122 to synchronize the tracking by rotary video head with the recorded track of the running tape. The circuit as shown in FIG. 14 (PRIOR ART) is helpful to reduce the jitter of reproduced video images by keeping the rotation speed of the rotary drum head constant. The circuit can also be used to provide variable speed playback.

One proposal for preventing illegal reproduction of a video cassette is to not record the control signal on the copied tape or to inject pseudo synchronizing signals or to take out a part of the synchronizing signal so as not to reproduce a synchronizing signal that will cooperate with the synchronizing circuitry of a TV receiver.

U.S. Pat. No. 3,963,865 to Songer issued (Jun. 15, 1976) discloses an arrangement for not recording the control signal on the reproduced videotape by using only one and one-half of the vertical synchronizing pulse signals and erasing or otherwise removing the remaining synchronizing pulse signal. The teachings of U.S. Pat. No. 3,963,865 are hereby incorporated by reference as if fully set forth herein. One and one-half of a vertical synchronizing pulse referred to here means one and one-half of the six pulses in the vertical synchronizing signal partition B as shown in FIG. 9A (PRIOR ART). Whether six pulses or one and one-half pulses are used, they are taken out as one square wave pulse in the vertical synchronizing signal separating circuit of the TV receiver. In the Songer patent, the vertical synchronizing pulse is separated from the vertical synchronizing signal circuit by about 48 microseconds (3H×1.5/6=0.75H).

In the case of videotape recorded by a VTR with helical scanning type rotary two heads described in Tokkaisho 52-130314 (corresponding U.S., if any, unknown at this time), there has been proposed a videotape copy protection method which prevents the reproducing of composite synchronizing signals on a copied videotape. The vertical synchronizing signal is recorded in a "weakened" state on the video track of the videotape. In the weakened state as disclosed in Tokkaisho 52-130314, the base of one square wave pulse width corresponds to about 3H separated by the vertical synchronizing signal circuit and in FIG. 2 of the patent document a suggestion is made to make the width about 96 micro-seconds (1.5H) or to make the signal height to one-half normal value.

All of these methods attempt to make normal playback of a copied video cassette difficult by modifying the vertical synchronizing signal in the copy. The techniques mentioned above were effective in VTRs made prior to 1976 (the year when these patents were applied for) and in specific types of post-1976 VTRs. However, these techniques are no longer effective with the higher technology VTRs now in use. This is primarily because VTRs now in use include automatic waveform regulating functions. As far as the inventor of the present invention has checked, the aforementioned techniques when employed with currently marketed VTRs produced normal pictures from copied video cassette tapes.

In Tokkaisho 54-108612 (corresponding U.S., if any, unknown at this time), it has been proposed to overlap the pulse corresponding to about 100% of the white level to a part of the vertical synchronizing signal to prevent recording by the working of the automatic gain control circuit of the VTR. This method is not always effective. It is more effective on some machines than on others.

None of the known techniques are universally applicable to currently marketed VTRs as an effective countermeasure to prevent illegal copying of videotape cassettes.

SUMMARY OF THE INVENTION

It is an object of the present invention to provide a copy protected recorded videotape that is effective with presently marketed VTRs.

The present invention provides copy protection of recorded videotape by recording composite synchronizing signals on at least a part of the tape, wherein the width of the vertical synchronizing pulses discernible by the vertical synchronizing signal separating circuit of a television receiver has a pulse width in the range of 1-20 micro-seconds. All other vertical synchronizing pulses in the vertical synchronizing signal partition, all the equalizing pulses and at least a part of the horizontal synchronizing pulses following the vertical synchronizing signal partition in the composite synchronizing signal with a signal height less than a predetermined pedestal level of the synchronizing signals.

More specifically, the present invention is directed to a copy protected pre-recorded videotape intended for playback by a helical scanning rotary head videotape machine for viewing on a television receiver, copy protection being provided by recording on the videotape a television field signal including a composite synchronizing signal for controlling the image produced by the television receiver, the composite synchronizing signal comprising: a vertical synchronizing pulse in the vertical synchronizing signal partition having a pulse width in the range of 1-20 micro-seconds and a pulse height discernible by a vertical synchronizing signal separating circuit of the television receiver; and all other vertical synchronizing pulses in the vertical synchronizing signal partition, all equalizing pulses in the equalizing signal partition following the vertical synchronizing signal partition and at least a part of the horizontal synchronizing pulses in the horizontal synchronizing signal partition following the equalizing signal partition in the composite synchronizing signal having a pulse height less than a predetermined pedestal level of the standard television signal.

DETAILED DESCRIPTION OF THE PREFERRED EMBODIMENTS

Figure 1A:
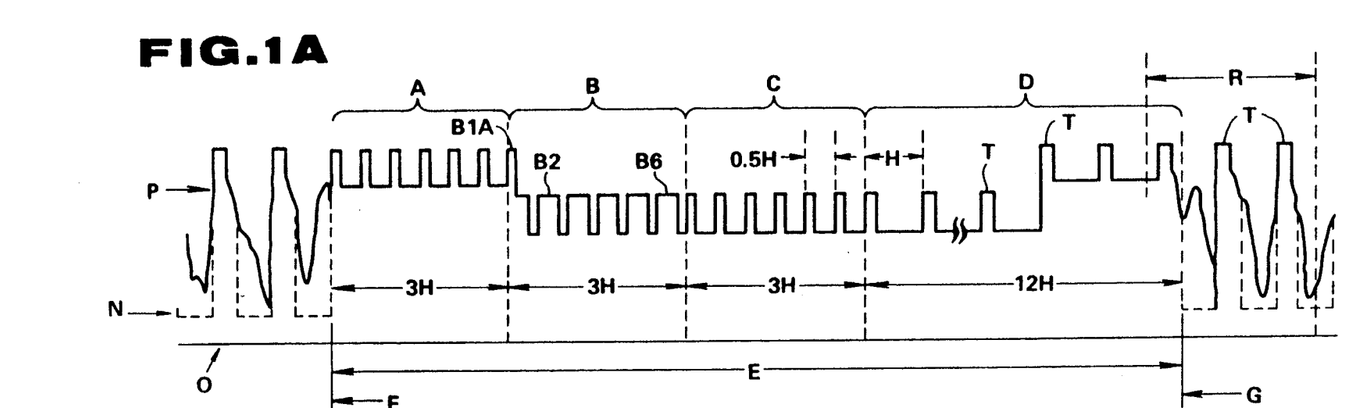
FIG. 1A is a waveform of the composite synchronizing signal of a television signal recorded on a copy protected videotape in accordance with the principles of the present invention.

FIG. 1A is a waveform of the composite synchronizing signal of a television signal recorded by the present invention corresponding to FIG. 9A (PRIOR ART) which shows the standard TV signal waveform. Both waveforms in FIGS. 1A and 9A have the same six standard equalizing pulses in the first equalizing signal partition A. However, within the vertical synchronizing signal partition B of FIG. 1A, there is only one pulse B1A having a pulse width in the range of 1-20 microseconds as a vertical synchronizing pulse discernible by a vertical synchronizing signal separating circuit of a television receiver. The height of pulse B1A is greater than the pedestal level P needed for discernment by the vertical synchronizing pulse separating circuit of the television receiver. Therefore, only pulse B1A having a width corresponding to 1-20 micro-seconds is a vertical synchronizing pulse capable of being recognized by the vertical synchronizing signal separating circuit of a TV receiver and no other vertical synchronizing pulse within the B partition exists above the pedestal level P. Likewise in FIG. 1A, all the equalizing pulses that exist in the equalizing signal partition C following the vertical synchronizing signal partition B and the horizontal synchronizing pulse T except for the last three pulses of T are lower than the pedestal level P.

Figure 13:
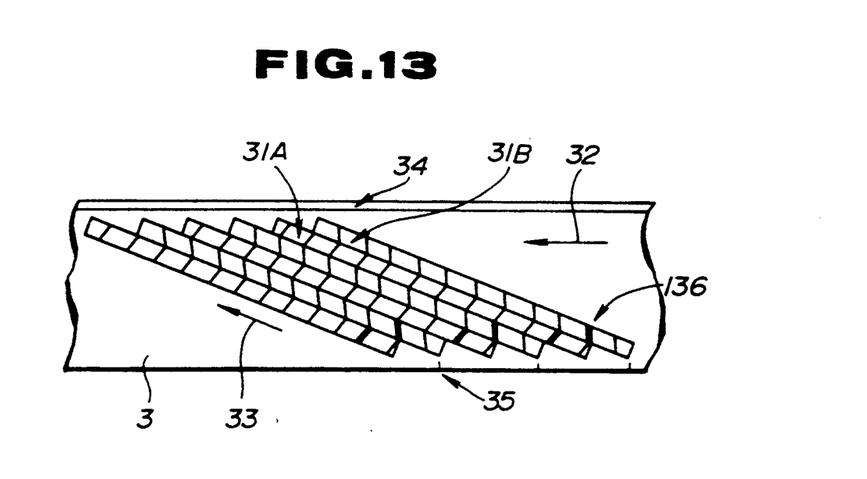
FIG. 13 is an example of a video track recorded by the present invention.

The vertical synchronizing signal portion 136 shown in FIG. 13 based on the waveform shown in FIG. 1A has a much smaller width than its corresponding portion shown in FIG. 12 (PRIOR ART) showing the recorded track of the prior art.

Figure 1B:
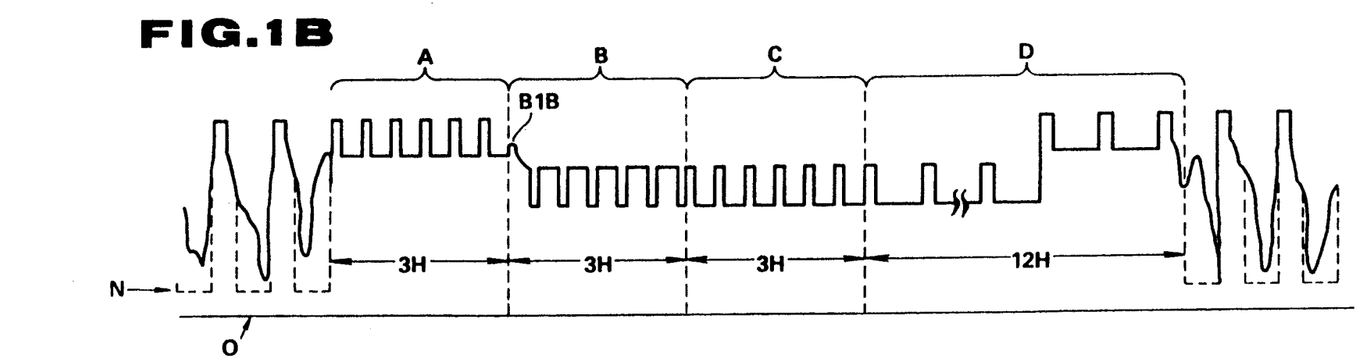
FIG. 1B is the waveform of the composite synchronizing signal of a television signal recorded on a videotape copied from the recorded videotape of FIG. 1A in accordance with the principles of the present invention.

FIG. 1B is a drawing showing the waveform of the composite synchronizing signal of a television signal recorded on the copied tape from the recorded videotape having the composite sychronizing signal shown in FIG. 1A. When the original copy-protected tape is copied to another tape by using two sets of VTRs, the square wave of the vertical synchronizing pulse B1A, having a pulse width in the range of 1-20 microseconds, is integrated by electric resistance and stray capacitance of the cable connecting the two VTRs together. The recorded vertical synchronizing pulse on the copied videotape has a low height and the waveform is slowly rising as shown in B1B of FIG. 1B. The signal as recorded on a tape copied from the copy-protected original is not able to provide a proper vertical synchronizing signal to a TV receiver.

The equalizing pulses in the equalizing signal partition C and at least a part of the horizontal synchronizing pulses T existing in the horizontal synchronizing signal partition D in the composite synchronizing signal must be under pedestal level. Otherwise, if there is a higher pulse than the pedestal P in this partition, it might be picked up as a vertical synchronizing pulse.

Figure 2A:
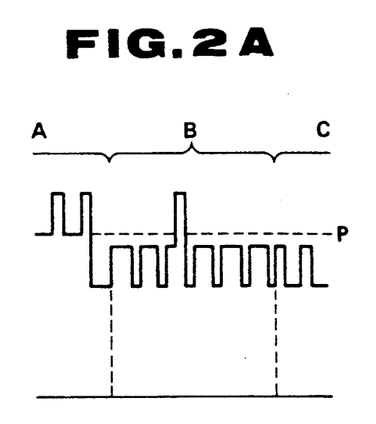
FIGS. 2A and 3A are waveforms of the vertical synchronizing signal having a narrow pulse width in accordance with the principles of the present invention.
Figure 3A:
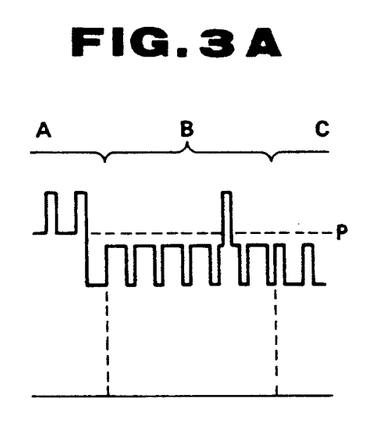

FIGS. 2A and 3A show the waveform of the vertical synchronizing signal partition B placing the vertical synchronizing pulse having a pulse width in the range of 1-20 micro-seconds in a different position from that of FIG. 1. It is not always necessary to place the vertical synchronizing pulse at the head of the vertical synchronizing signal partition B.

Figure 2B:
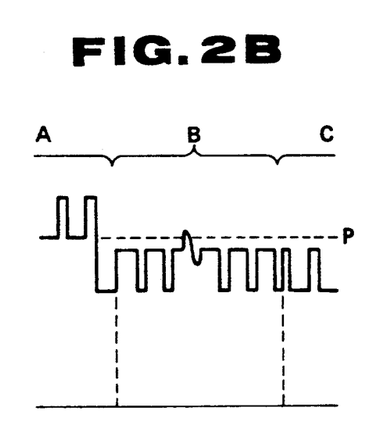
FIGS. 2B and 3B show the waveform of the composite synchronizing signal of a television signal recorded on a copied videotape in accordance with the principles of the present invention.
Figure 3B:
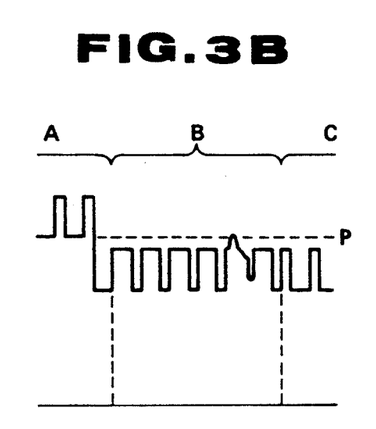

FIGS. 2B and 3B correspond to 2A and 3A, respectively, and show the waveform of the vertical synchronizing pulse recorded on the copied tape by using two sets of VTRs from the pre-recorded videotape with the vertical synchronizing pulse shown in FIGS. 2A and 3A. As shown in FIGS. 2B and 3B, the original vertical synchronizing pulse with a narrow width of 1-20 micro-seconds is integrated by electric resistance and stray capacitance of the cable connecting the two sets of VTRs so that the signal is recorded on the copy with a lower height of and a waveform of slowly rising shape which is not a square wave and does not provide the proper vertical synchronizing pulse to a TV receiver.

A pulse with a width of 1-20 micro-seconds in the pre-recorded videotape of the present invention provides a vertical synchronizing pulse discernible by the vertical synchronizing signal separating circuit of a TV receiver and is able to produce a normal TV picture on the TV receiver. However, the copy signal thereof having lower height and a rounded waveform fails to trigger the vertical synchronizing signal separating circuit of a TV receiver and does not provide the proper synchronization as the copied videotape is played back.

In the present invention, the number of the vertical synchronizing pulses having a pulse width in the range of 1-20 micro-seconds discernible by vertical synchronizing signal separating circuit of a TV receiver is not necessarily limited to only one. When two or more vertical synchronizing pulses having a pulse width in the range of 1-20 micro-seconds are placed with respect to each other so that there is an interval therebetween of three or more times the width of the pulse, the signals copied from them by using two sets of VTRs have a waveform of low height and slowly rising at the beginning of the signal, which has been integrated by the electrical resistance and stray capacitance of the cable connecting two sets of VTRs during the copying. Therefore, several numbers of vertical synchronizing pulses can be provided within the vertical synchronizing partition B.

Figure 4A:
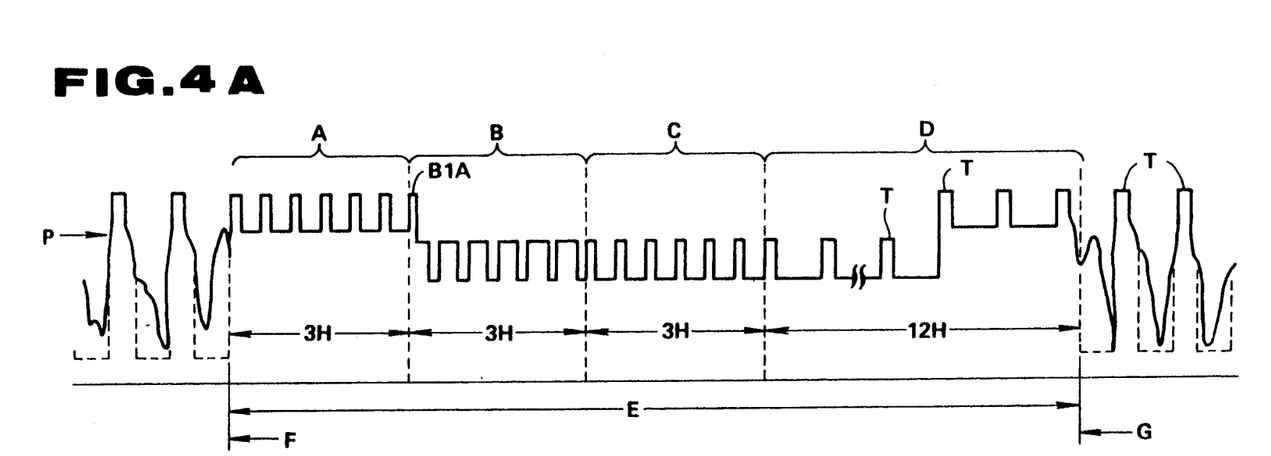
FIGS. 4A and 4B illustrate another embodiment of waveforms of the composite synchronizing signal of a television signal recorded on a copy protected videotape in accordance with the principles of the present invention, wherein the waveform shown in FIG. 4A (the same as shown in FIG. 1A) and the waveform shown in FIG. 4B are recorded alternately.
Figure 4B:
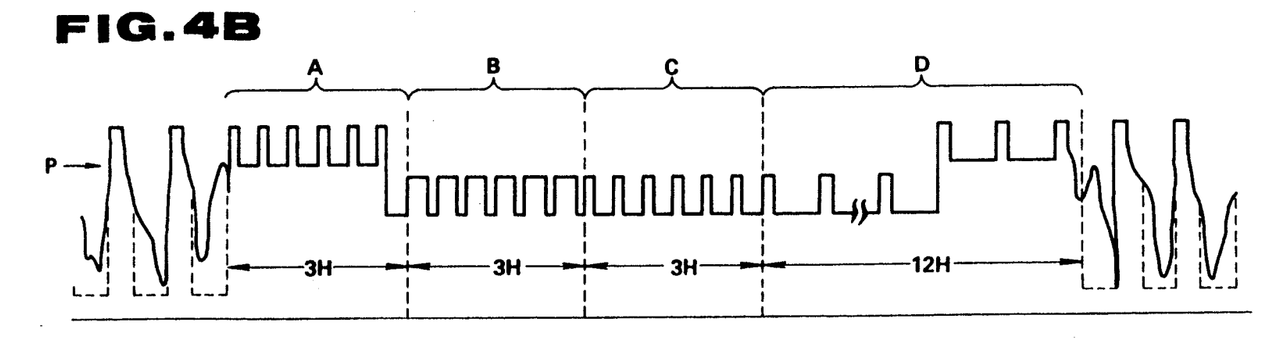

The composite synchronizing signal waveform in the vertical blanking interval E as illustrated in FIG. 1A or FIG. 4B (the same waveform as illustrated in FIG. 1A) may be recorded successively in every field, that is, in odd and even number fields as shown in FIG. 8. However, it may be recorded in every other field alternately with a composite synchronizing signal as illustrated in FIG. 4B wherein all the vertical synchronizing pulses in the vertical synchronizing signal partition B, all the equalizing pulses in the equalizing signal partition C and at least a part of the horizontal synchronizing pulses in a horizontal synchronizing partition D with a pulse height less than a predetermined pedestal level of the standard TV signal and having no vertical synchronizing pulse with a pulse height discernible by the vertical synchronizing signal separating circuit of a TV receiver.

Even if the vertical synchronizing pulse discernible by the vertical synchronizing signal separating circuit of a TV receiver is recorded in every other field, a normal image can be reproduced on the TV receiver, as the synchronizing lag therebetween is negligible.

The above-described method would be effective to prevent copying of a videotape recorded on VHS-type format of VTR which is the most popular on the market. But the aforementioned method fails to prevent copying of a videotape recorded on Beta-type format of VTRs or corresponding 8 mm type. It also fails to prevent illegal copying of VHS-type videotape by professionals using professional use apparatus in combination with a Time Base Corrector (TBC) or by amateurs using a high grade VHS-type VTR for home use equipped with TBC.

To prevent this, there is also provided an alternative embodiment of the present invention. The waveform of the above-mentioned television field signal is modified as follows.

Figure 5:
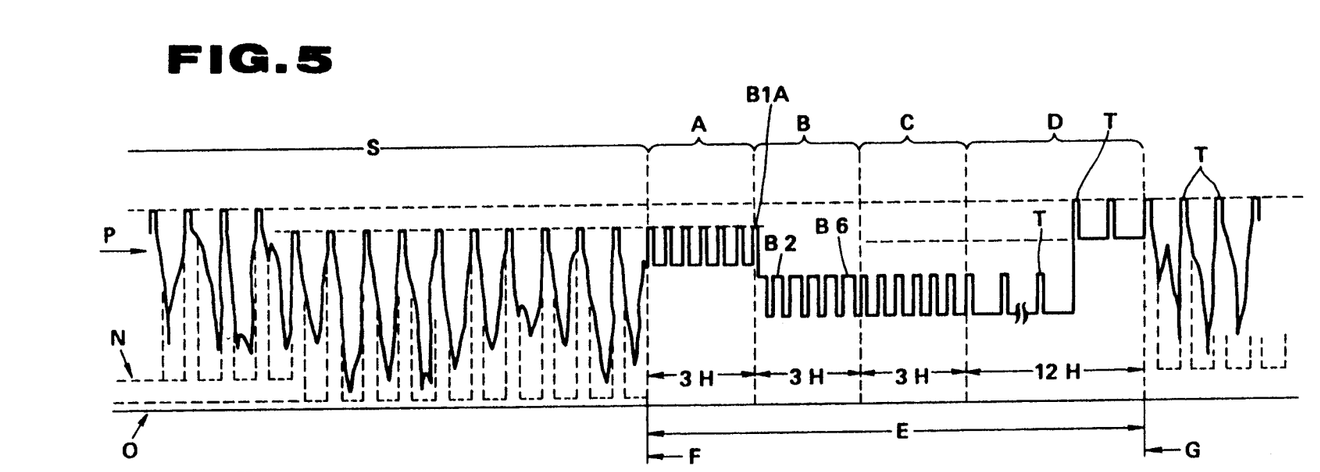
FIG. 5 illustrates another embodiment of a waveform of the composite synchronizing signal of a television signal recorded on a copy protected videotape in accordance with the principles of the present invention.

FIG. 5 illustrates a waveform of another embodiment of the present invention, wherein portions of the television field signal have a lowered signal level. Specifically, the following portions of the television field signal are reduced to have a pulse level less than a predetermined level of the standard television signal: all equalizing pulses in the first equalizing signal partition A; the vertical synchronizing pulse having a pulse width in the range of 1-20 micro-seconds and a pulse height discernible by a vertical synchronizing signal separating circuit of the television receiver in the vertical synchronizing signal partition B; all other vertical synchronizing pulses in the vertical synchronizing signal partition B; all equalizing pulses in the equalizing signal partition C; at least a part of the horizontal synchronizing pulses in the horizontal synchronizing signal partition D; and the last 6-14 image signals in the area S preceding the composite synchronizing signal in the vertical blanking interval E. Thus, all equalizing pulses in the first equalizing signal partition A, all vertical synchronizing pulses in the vertical synchronizing signal partition B, all equalizing pulses in the second equalizing signal partition C and at least a part of the horizontal synchronizing pulses in the horizontal synchronizing signal partition D are lowered from the original signal level. The degree of the lowering of the signal level is preferably in the range of 60-80% of the level difference between the white level N and zero level O.

Figure 6:
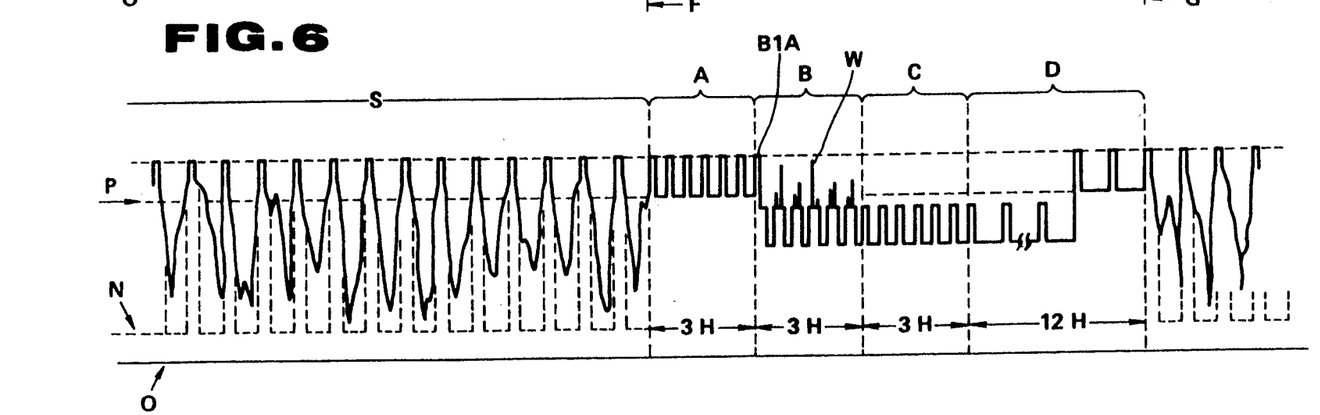
FIG. 6 illustrates another embodiment of a waveform of the composite synchronizing signal of a television signal recorded on a copy protected videotape in accordance with the principles of the present invention.

FIG. 6 illustrates a waveform of another embodiment of the present invention wherein the composite synchronizing signal of the television field signal is superimposed with one or plural number of pulses W having a pulse width in the range of 0.1-5 micro-seconds in the vertical synchronizing signal partition B. The vertical synchronizing signal partition B includes the aforementioned vertical synchronizing pulse B1A which has a pulse width in the range of 1-20 micro-seconds and a pulse height discernible by a vertical synchronizing signal separating circuit of the television receiver. All other vertical synchronizing pulses in the vertical synchronizing signal partition B, all equalizing pulses in the equalizing signal partition C following the vertical synchronizing signal partition B and at least a part of the horizontal synchronizing pulses in the horizontal synchronizing signal partition D following the equalizing signal partition C in the composite synchronizing signal have a pulse height less than a predetermined pedestal level of the standard television signal.

In this state of randomly overlapping one to several number of pulses W having a width in the range of 0.1–5 micro-seconds, the number of overlapping pulses W is normally 1–10, preferably 5–10. Preferably the pulses W each have a different width, strength (height), position and mutual intervals etc., and are in an entirely irregular state with respect to each synchronizing signal in the vertical synchronizing signal partition B. In other words, the state of overlapped pulses having a width in the range of 0.1–5 micro-seconds are completely different with respect to each other between a vertical synchronizing signal partition and neighboring ones.

Figure 7:
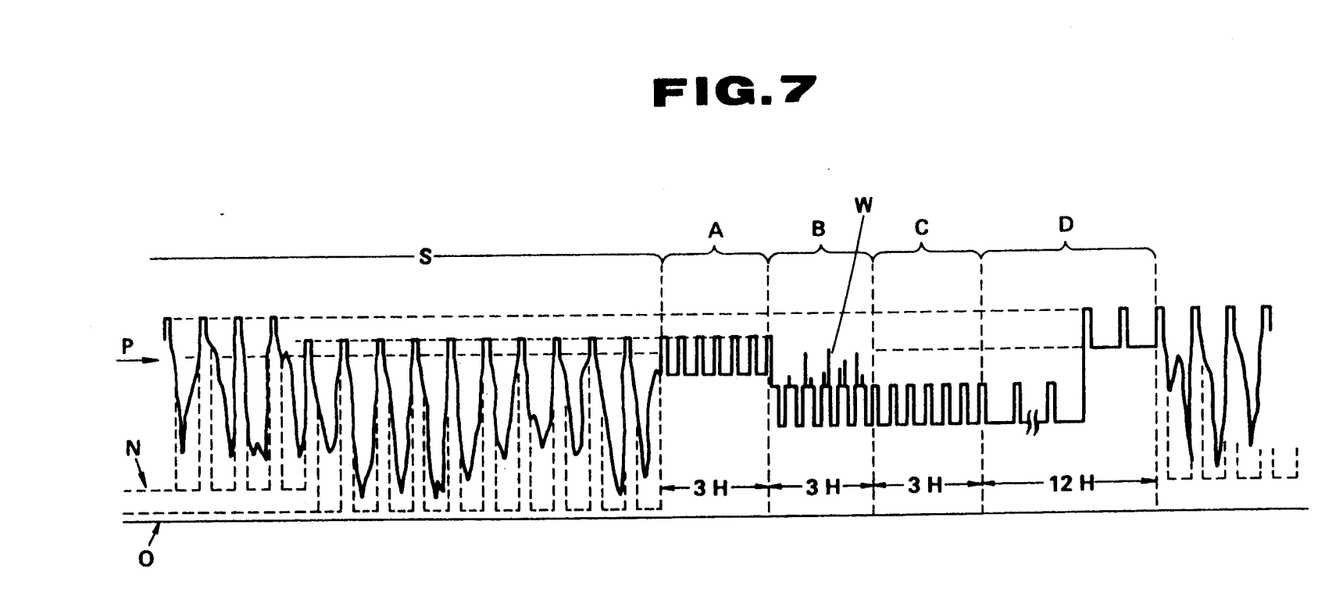
FIG. 7 illustrates another embodiment of a waveform (combination of the waveform shown in FIGS. 5 and 6) of the composite synchronizing signal of a television signal recorded on a copy protected videotape in accordance with the principles of the present invention.

FIG. 7 illustrates a waveform of another embodiment of the present invention which is a combination of the waveform shown in FIGS. 5 and 6.

Based on a pre-recorded master tape having a standard composite synchronizing signal, it is easy to produce the above-mentioned television field and frame signals by modifying them with conventional electronic circuits.

According to the present invention, the commercial pre-recorded video cassette tape is prepared such that the signal track is recorded with at least one of the composite synchronizing signals as shown in FIGS. 1A, 4A and 4B, 5, 6, 7. As a result, it is not possible to make illegal copies if such signal tracks are provided at key points along the tape, (for example, one minute of every five). Performance is optimized, however, if such signal tracks are prepared universally throughout the videotape cassette. If proper electronic circuits are used, the present invention can be practiced without difficulty and it is not necessary to apply it partly.

The following tests were conducted and the results are set forth below.

TEST #1

A video signal train (corresponding to a standard television signal train) was generated from a pre-recorded VHS format videotape purchased on the market, and every field signal therein was encoded as shown in FIG. 1A, and was recorded on the commercially available blank video cassette tape by electronic circuitry.

The above videotape upon playback using VHS type VTR produced a normal picture on commercial TV receiver. The machines tried were VHS type Victor Co. model BR-7000R, Victor Co. model HRD-380 or Matsushita Electric Co. model F-21 McRoad.

However, when a copy of the above videotape was made by using two sets of VHS type VTRs as mentioned above, the copied videotape failed to produce an acceptable picture on a commercial television receiver.

TEST #2

The video signal train as explained in TEST #1 was further encoded as shown in FIGS. 5, 6 or 7 and was recorded on commercially available blank video cassette tapes respectively.

In FIG. 5 type, the degree of the lowering of the signal level to the waveform as explained in TEST #1 was 70% of the level difference between the white level N and zero level 0.

In FIG. 6 type, ten pulses having a pulse width in the range of 0.1–3 micro-seconds and with a different pulse height each other were overlapped randomly to the vertical synchronizing pulse in the vertical synchronizing partition B of the waveform as explained in the TEST #1.

In FIG. 7 type, the waveform was a combination of the waveforms as shown in FIGS. 5 and 6, that is, ten pulses having a pulse width in the range of 0.1–3 micro-seconds and with a different pulse height each other were overlapped randomly to the vertical synchronizing pulse in the vertical synchronizing partition B of the waveform as shown in FIG. 5.

These video cassette tapes bearing the waveforms as shown in FIGs. 5, 6 or 7 upon playback using VHS type VTR produced a normal picture on commercial TV receiver. The machines tried were VHS type Victor Co. model BR-7000R, Victor Co. model HRD-380 or Matsushita Electric Co. model F-21 McRoad.

However, copied videotapes made from the above-mentioned videotapes, by using high quality VTRs such as Matsushita Electric Company models S-VHS AG-3750 McRoad and S-VHS AG-3700 McRoad; Victor Company model S-VHS BR-S3600, and professional use duplicator (with TBC), failed to produce an acceptable picture in a television receiver.

TEST #3

A video signal train was generated from a pre-recorded Beta format videotape purchased on the market, and every field signal therein is encoded as shown in FIGS. 5, 6 or 7 and was recorded on commercially available blank video cassette tapes respectively.

The above videotape upon playback using Beta type VTR produced a normal picture on commercial TV receiver. The machines tried were Sony Corporation models SL-HFR-HiFi, and SL-HF-1000D; 8 mm type Sony Corporation model EV-5700.

However, when a copy of the above videotape was made by using two sets of Beta type VTRs as mentioned above, the copied videotape failed to produce an acceptable picture on a commercial television receiver in every case.

Even if a professional specialist tried to make an illegal copy, using a professional apparatus in combination with Time Base Corrector (TBC) or high quality home use VTR with TBC, it would be impossible to reproduce the normal vertical synchronizing signal.

This invention can be applied to any television system such as NTSC, PAL or SECAM.

While this invention has been described in connection with what is presently considered to be the most practical and preferred embodiment, it is to be understood that the invention is not limited to the disclosed embodiment, but, on the contrary, is intended to cover various modification and equivalent arrangements included within the spirit and scope of the appended claims.

I claim:

1. A method of recording video signals on a first videotape to allow display of video picture information on a television receiver having a synchronizing signal separating circuit, the method preventing playback from a second videotape made from the first videotape on a videotape machine, the method comprising the steps of:

generating a video signal train corresponding to a television signal train from a video information source, said video signal train comprising video picture information and a composite synchronizing signal in a vertical blanking interval to control the picture field and frame, the composite synchronizing signal including a first equalizing signal partition, a vertical synchronizing signal partition, a second equalizing signal partition and a horizontal synchronizing signal partition; and encoding the vertical synchronizing signal of said video signal train by:

forming a vertical synchronizing pulse having a pulse width of 1–20 micro-seconds and a pulse height discernible by a vertical synchronizing signal separating circuit of a television receiver, reducing a signal level of the vertical synchronizing signal partition, except for said vertical synchronizing pulse, below a pedestal level of the television signals, and reducing a signal level of the second equalizing signal partition and at least a part of the horizontal synchronizing signal partition below the pedestal level of the television signals, said encoding enabling display upon receipt of the resulting encoded video signal train by a television receiver, said encoding preventing normal operation of the vertical synchronizing signal separating circuit of the television receiver if the encoded signal is copied to said second videotape; and recording the encoded video signal on a blank videotape.

2. A method of copy protecting a videotape comprising the step of recording on the videotape a television field signal, the television field signal including a composite synchronizing signal, the television field signal recording step including the steps of:

first recording a first equalizing signal partition having an equalizing pulse train;

second recording a vertical synchronizing signal partition having a first vertical synchronizing pulse and a plurality of second vertical synchronizing pulses, the first vertical synchronizing pulse having a pulse height discernable by a separation circuit of a television receiver and a pulse width within in a range of 1–20 microseconds, the composite synchronizing signal thereby controlling a generated television receiver image, the second vertical synchronizing pulses having a pulse height below a predetermined pedestal level of a standard television signal, the pulse height of the first vertical synchronizing pulse being above the pedestal level;

third recording a second equalizing signal partition having pulses below the pedestal level; and fourth recording a horizontal synchronizing signal partition having at least one horizontal synchronizing pulse having a pulse height below said pedestal level.

3. A method according to claim 2, wherein said second recording step includes the step of providing to the vertical synchronizing signal partition at least one superimposed pulse having a pulse width in the range of 0.1–5 micro-seconds, said at least one superimposed pulse being superimposed on a corresponding at least one of the second vertical synchronizing pulses.

4. A method according to claim 2, wherein:

the television field signal recording step further includes the step of recording a plurality of image signals before first recording said first equalizing signal partition, said plurality of image signals including a group of at least six consecutive image signals immediately preceding said composite synchronizing signal, said group having a reduced signal level relative to said plurality of image signals; and said composite synchronizing signal has said reduced signal level.

* * * * *